UNITED STATES PATENT OFFICE.

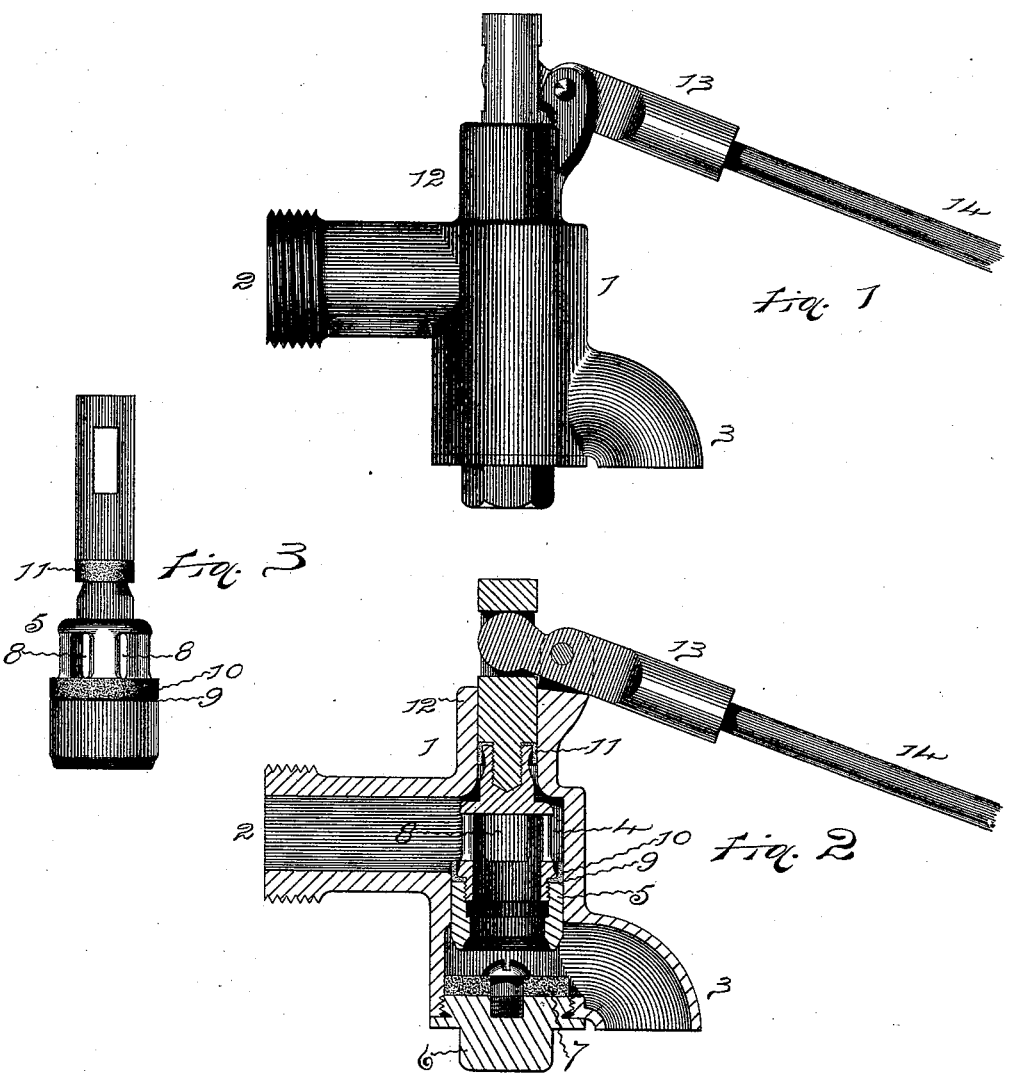

CORNELIUS BIRKERY, OF HARTFORD, CONNECTICUT, ASSIGNOR TO THE BIRKERY MANUFACTURING COMPANY, OF SAME PLACE.

VALVE.

SPECIFICATION forming part of Letters Patent No. 537,266, dated April 9, 1895.

Application filed November 1, 1893. Serial No. 489,697. (No model.)

*To all whom it may concern:*

Be it known that I, CORNELIUS BIRKERY, a citizen of the United States, residing at Hartford, in the county of Hartford and State of Connecticut, have invented certain new and useful Improvements in Valves, of which the following is a specification.

The invention relates to the class of valves more particularly intended for use in flushing-tanks, and commonly known as ball-cocks, which are balanced so as to operate easily and surely; and the object is to provide a very simple, cheap and efficient balanced valve of this class, having only a few parts, that can be easily and quickly put together so that the valve can be shut securely with the pressure of the water by a small float without singing or hammering.

Referring to the accompanying drawings:— Figure 1 is a side view of the valve. Fig. 2 is a central vertical section; and Fig. 3 is a detail side view of the balanced spindle.

In the views, 1 indicates the shell, which is cast to shape of any suitable metal, with an inlet 2 adapted to be attached to a supply pipe, an outlet 3 for the discharge of water, and between the inlet and outlet, a chamber 4 for the reciprocating spindle 5. An opening is made through the shell into the chamber, to permit the insertion of the spindle, which opening is occupied by a cap 6, that can be tightly screwed in place, or easily removed when desired. A seat 7, formed of leather, asbestos or other suitable substance, is usually secured to this cap or held in place by it, and the spindle with the edge of the head-end so shaped that it can tightly close against the seat, reciprocates toward and from this seat-packing to close and open the valve. The head of the spindle is hollow, with openings or ports 8 made through the walls, so that when the end is raised from the seat, water can flow from the inlet, through the ports into the hollow spindle and out around the edge of the spindle past the seat so as to discharge through the outlet bib. A shoulder 9 is made on the head of the spindle, and a cup packing 10 that fits the walls of the chamber, is placed on the spindle at the shoulder between the inlet and the seat. It is preferred to accomplish this by making the head of the spindle in two parts and screwing them together with the cup packing held between, as shown in Fig. 2. The shank of the spindle which is considerably smaller than the head, is usually provided with a small cup packing 11, that prevents the escape of water through the hub 12 formed on the shell for supporting the shank of the spindle. This shank is usually screwed to the head of the spindle, with the small cup packing held between the parts at the joint, and the outer end is slotted to receive the end of the float lever 13 that is pivoted to the shell in any suitable manner to properly receive the end of the float rod 14 that may have any common float.

When the level of the water in the tank is lowered, the dropping float, by means of the pivoted float lever, moves the spindle so that the head end is drawn from the seat. Then water which enters the hollow spindle through the ports passes out by the seat and discharges through the outlet bib into the tank to again raise the level of the water. When the float rises with the water, it moves the spindle toward the seat to close the valve and shut off the water. As the float rises and the spindle moves in the direction of the flow of the water to close the valve, of course the pressure increases, and this pressure acting upon the cup packing on the spindle, aids in moving the spindle to close the valve, and also helps hold the spindle to the seat against the force of water that tends to escape between the edge of the end of the hollow spindle and the seat.

Of course in constructing the valve, the area of the shoulder and the packing which forms the balance can be readily increased or diminished in order to properly balance the spindle and make it shut easily and securely against the pressure of the water in the system in which the valve is placed.

By means of this construction, a simple, small and cheap valve with a large waterway can be produced, which valve is very durable and sure in operation with a small float under high pressures, without any singing or hammering when in use.

I claim as my invention—

A valve consisting of a shell with an inlet and outlet, a spindle reciprocating in the shell, said spindle having a hollow head, a smaller perforated part, a packing held between these parts of the spindle head exposed to the pressure of the water in the direction of its flow, and a shank secured to the spindle with a packing at the joint exposed to the pressure of the water in the direction opposite to its flow, substantially as specified.

CORNELIUS BIRKERY.

Witnesses:
H. R. WILLIAMS,
CLARENCE E. BUCKLAND.